United States Patent [19]

Pedretti

[11] Patent Number: 4,863,594
[45] Date of Patent: Sep. 5, 1989

[54] AQUARIUM FILTRATION SYSTEM

[76] Inventor: John W. Pedretti, 3528 Newridge Dr., Rancho Palos Verdes, Calif. 90274

[21] Appl. No.: 257,084

[22] Filed: Oct. 13, 1988

[51] Int. Cl.$^4$ .............................. A01K 63/04
[52] U.S. Cl. .................... 210/169; 210/220; 119/5; 261/77; 261/122; 261/123
[58] Field of Search .................... 210/169, 416.2, 220; 119/3, 5; 261/77, 122, 123

[56] References Cited

U.S. PATENT DOCUMENTS

| | | | |
|---|---|---|---|
| 3,135,238 | 6/1964 | Eyl | 119/5 |
| 3,516,544 | 6/1970 | Sesholtz | 210/169 |
| 3,815,547 | 6/1974 | Willinger et al. | 210/169 |
| 3,827,560 | 8/1974 | Morton | 210/169 |
| 4,025,431 | 5/1977 | Saxton | 210/169 |
| 4,042,510 | 8/1977 | Sullins | 210/220 |
| 4,098,230 | 7/1978 | Jackson | 210/169 |

Primary Examiner—Richard V. Fisher
Assistant Examiner—Coreen Y. Lee

[57] ABSTRACT

An aquarium filtration system using airlift to circulate water within the living area to display aquatic organisms, water rising up through the bottom gravel, the gravel providing biological filtration. The living area of the acquarium is free from mechanical obstructions and rising air bubbles. A relatively inexpensive air pump generates the air lift, for circulating water within the living area. Water is removed at the water's surface and thereafter mechanically and chemically filtrated. A protein skimmer device is provided as an integral part of the air lift and mechanical filtration chamber to remove dissolved organic and inorganic compounds.

9 Claims, 2 Drawing Sheets

AQUARIUM FILTRATION SYSTEM

BACKGROUND OF THE INVENTION

1. Field of the Invention

The present invention relates to aquarium filtration systems utilizing mechanical, chemical and biological filtration techniques.

2. Description of the Prior Art

Aquatic life in an aquarium produces waste products and contaminants, such as nitrogenous wastes, fish feces, uneaten food, dead plant materials, etc. These waste products and contaminants are generally removed by filtration. The three basic types of filtration are mechanical, chemical and biological.

Biological filtration is accomplished by aerobic bacteria which colonize a substrate. Gravel provides the greatest amount of surface area for the colonization of bacteria in the aquarium. If oxygenated water is circulated through the gravel, aerobic bacteria will be encouraged and convert the organic waste by-products into less harmful substances. Thus, the gravel bed will function as a biological filter for organic waste products.

Chemical filtration absorbs undesirable gases and other contaminants. Typically, activated carbon is utilized for absorption. Mechanical filtration traps suspended particles. There are many forms of prior art filters which are utilized in the standard aquarium and incorporate one, two or all three of the above described filter types. For example, Malik U.S. Pat. No. 4,312,752 discloses a filter apparatus which mechanically, biologically and chemically filters an aquarium. A pump including an impeller and magnet is provided to circulate water through a filter and dispersion chamber, the filter apparatus being hidden from view; Cloke et al. U.S. Pat. No. 4,035,298 discloses an aquarium filter using mechanical, biological and chemical filtration, an air pump being used for moving water by streams of air directed through the water, rising air bubbles emitted in the main portion of the tank creating a circulation pattern of the water in the tank; and U.S. Pat. No. 4,606,821 to D'Imperio discloses a sectional aquarium having two compartments, an aquarium section with a biological filtering and a mechanical filtering chamber.

The prior art filter systems noted hereinabove provide specific advantages in their use. For example, the Malek system is constructed such that the living area of the aquarium is not obstructed; the Cloke et al patent discloses a filtering apparatus wherein substantially all of the water is continuously moved through the gravel filter bed and uses an air pump to circulate the water, an air pump being less costly than a water pump; and the D'Imperio discloses a system which continuously aerates and filters an aquarium and wherein the actual filter components are hidden from view.

The use of air to circulate water in an aquarium provides an effective and simple way to continuously oxygenate the circulating water. However, foam containing certain organic and inorganic compounds which adhere to the surface of the air bubbles can contaminate the aquarium unless removed, particularly in salt water aquariums. In order to remove this foam, prior art salt water aquariums incorporate a separate device, typically a vertically extending tube and aerator. This obviously increases the cost of salt water aquariums.

What is desired is to provide an air pump driven aquarium filtration system having a reverse flow (water flowing upwards through gravel) and surface skimming wherein the foam containing the organic/inorganic compounds is removed from the aquarium, the filtration system being efficient, easy to maintain and cost effective when compared to prior art systems.

SUMMARY OF THE INVENTION

The present invention provides an aquarium filtration system using air lift to circulate water within the area to display aquatic organisms, water rising through the bottom gravel. The aquarium is constructed so that the living area is free of the mechanical obstructions and rising air bubbles. A relatively inexpensive air pump generates air lift, to both oxygenate the water and circulate water within the living area. Water is removed at the surface and thereafter mechanically and chemically filtrated.

The use of an air lift provides numerous advantages. In particular, the water is more thoroughly oxygenated, and certain organic and inorganic compounds adhere to the surface of the air bubbles, the air bubbles being collected as foam on the surface and removed from the aquarium by the use of a relatively inexpensive absorption pad positioned in the mechanical filter chamber. In addition, the air lift forces the water to flow upward to the surface through the gravel enabling the gravel to stay clean for relatively long periods of time as the food and organic wastes are unable to accumulate in the gravel. It also ensures a more even flow of water throughout the entire gravel area, providing greater biological filtering capacity. The air lift provides greater dissolved oxygen concentrations in the water as it flows through the gravel, eliminating the need for having surface agitation, and providing relatively calm water. In addition, the use of an air pump instead of a water pump substantially decreases the cost of the aquarium filtration system.

The present invention can be utilized as an integrated aquarium-filtration system or can be incorporated as a separate filtration unit and then retrofitted into existing aquaria. It can be used in various sized and shaped tanks and is particularly adapted for salt water use.

BRIEF DESCRIPTION OF THE DRAWING

For a better understanding of the invention as well as other objects and further features thereof, reference is made to the following description which is to be read in conjunction with the accompanying drawing wherein.

DESCRIPTION OF THE PREFERRED EMBODIMENT

Figure 1:
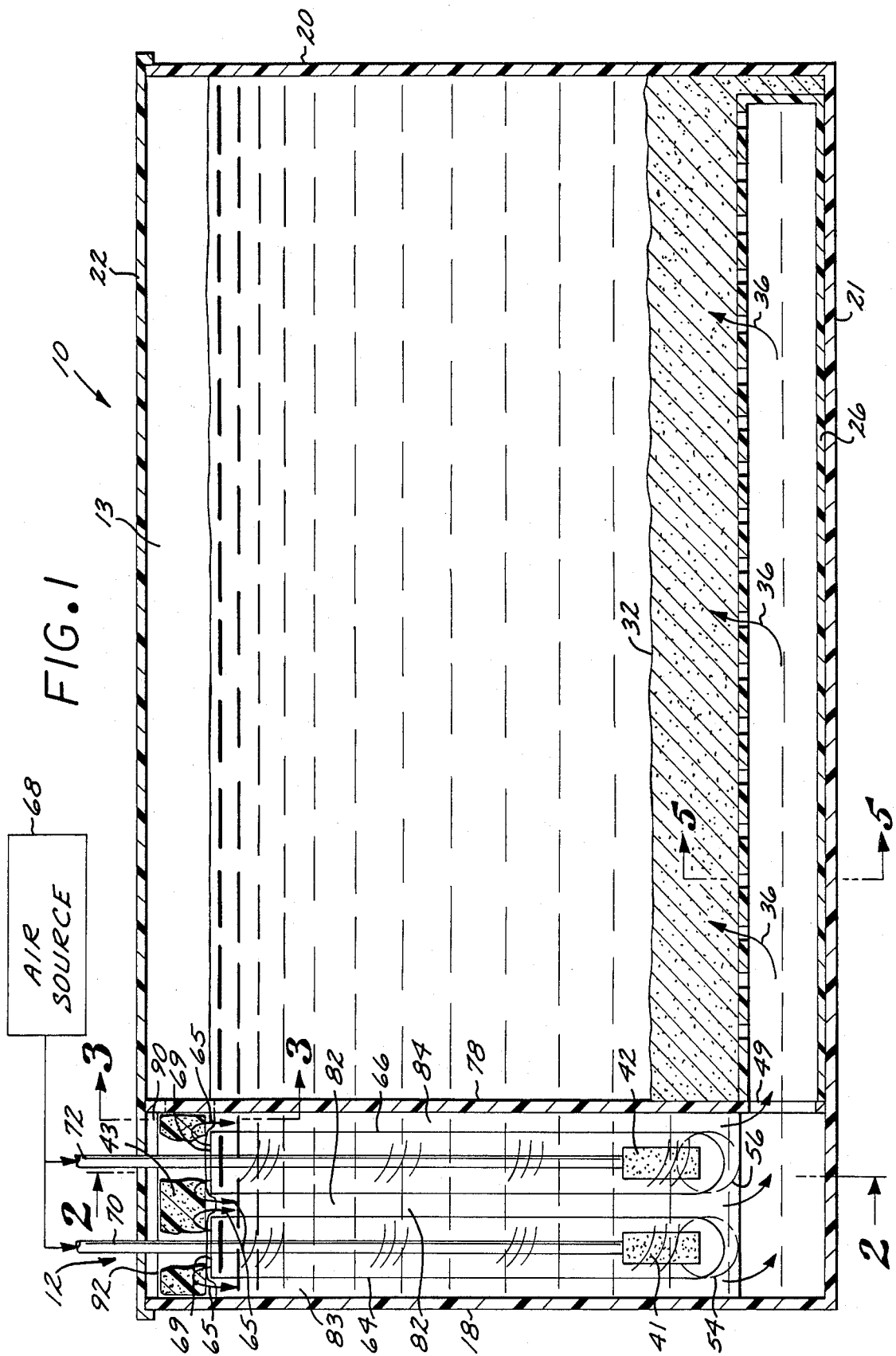
FIG. 1 is a front cross-sectional view, with a cutaway portion, of an aquarium tank equipped with the filtering apparatus of the present invention.
Figure 2:
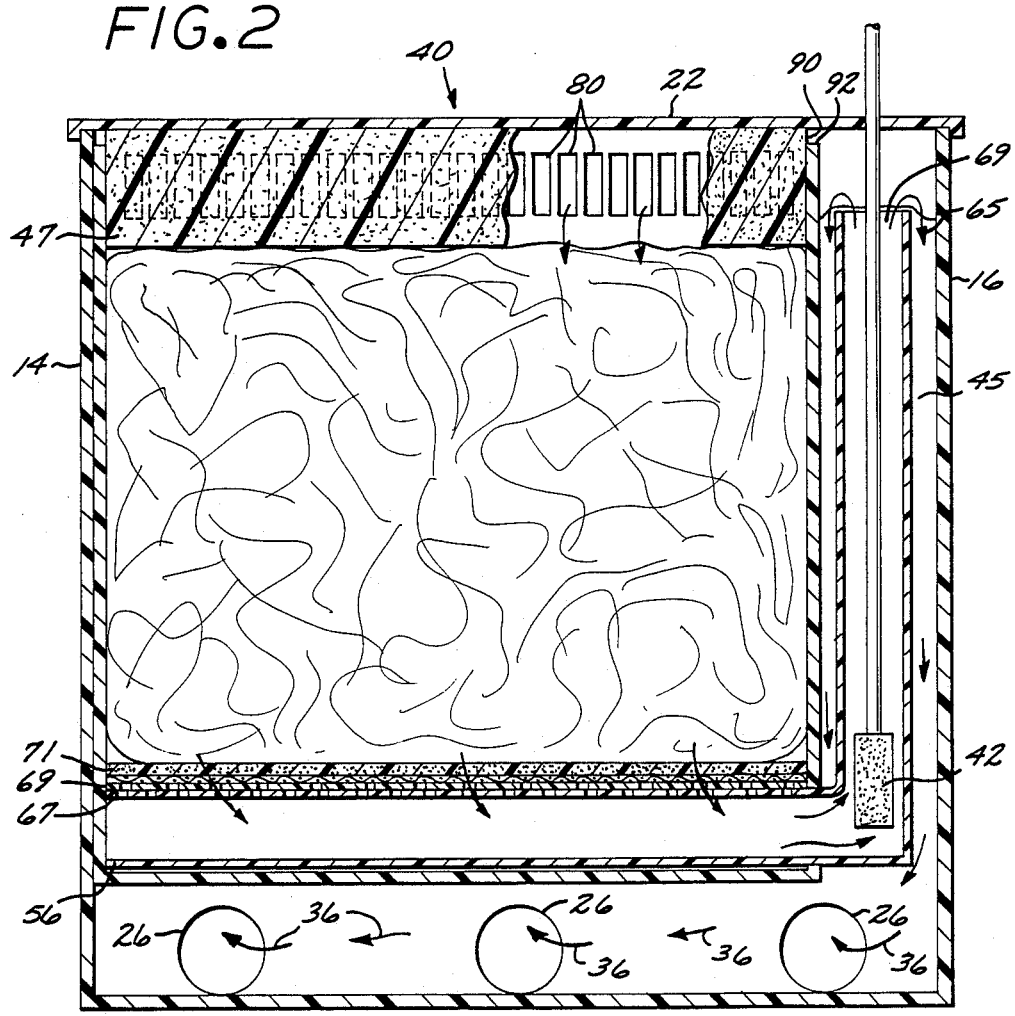
FIG. 2 is a cross-sectional view along line 2-2 of FIG. 1.
Figure 3:
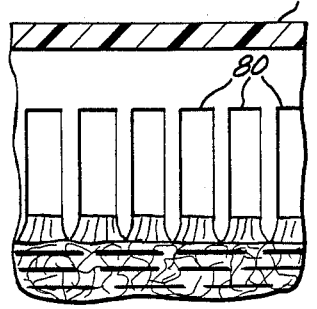
FIG. 3 is a cross-sectional view along line 3-3 of FIG. 1.
Figure 4:
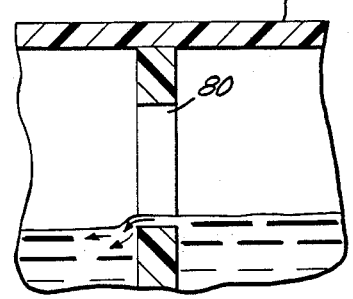
FIG. 4 is a detail illustrating water flow from the viewing section of the aquarium to the mechanical filter chamber.
Figure 5:
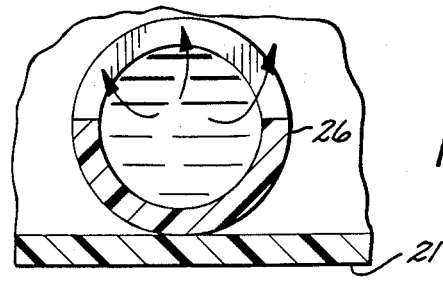
FIG. 5 is a cross-sectional view along line 5-5 of FIG. 1.

Referring to FIGS. 1-5, an aquarium tank 10 utilizing the filtration system 12 of the present invention is illustrated. The tank 10 is comprised of longitudinal back wall 14, front wall 16, end walls 18 and 20, bottom floor 21 and lid 22.

The filtration system 12 comprises a plurality of slotted pipes 26 positioned below an apertured grid (not shown) and gravel layer 32. Pipes 26 are supported on aquarium compartment floor 21. The water flow through pipes 26 and gravel 32, indicated by arrows 36, is explained more fully hereinafter. A mechanical and chemical filtration chamber 40 comprises two separate subchambers 45 and 47, subchamber 45 containing aerators 41 and 42 and vertically extending air lift tubes 64 and 66. Subchamber 47 contains a plastic sponge filter material 43, typically fabricated of polyurethane, and a pair of slotted pipes 54 and 56 horizontally positioned at the bottom of chamber 40 and in a direction substantially perpendicular to vertically extending air lift tubes 64 and 66, respectively. Pipes 54 and 56 are joined at their lower ends to pipes 64 and 66, respectively, at an approximately 45 degree angle and function to direct water returned to chamber 40 to air lift tubes 64 and 66. A flat, apertured grating 67 is positioned over pipes 54 and 56, an apertured fiberglass screen 69 is positioned on grating 67 and a carbon material layer 71 is positioned over fiberglass screen 69. Air is pumped from a conventional air pump 68 through tubes 70 and 72 into air lift tubes 64 and 66 respectively. The force of gravity then pulls the water down (illustrated by arrows 36 and 65) to fall to the bottom of chamber 40 and enter pipes 26 via apertures formed in wall 78 (only one aperture 49 is illustrated).

The living area of the aquarium, section 13, is separated from the mechanical filtration chamber 40, thus forming two separate and adjacent compartments, by the vertically positioned wall 78. The upper portion of wall 78 has a plurality of slots 80 formed therein.

In operation, when the air pump 68 is activated, air is forced down the tubes 70 and 72 into aerators 41 and 42, bubbles then rising in tubes 64 and 66 which in turn forces water in the air lift tubes 64 and 66 in the vertical direction, the water overflowing the tubes and falling, by the action of gravity, down in the space 82 between the air lift tubes, space 83 between tube 64 and wall 18 and space 84 between tube 66 and wall 78. The water then is directed to the pipes 26 and forced out through the slits therein, the water in turn rising upward through gravel layer 32. The gravel, as noted previously, provides the biological filtration.

When the water level is high enough in aquarium compartment 13, water flows through slots 80 of wall 78 into the mechanical filtering chamber 40. Slots 80 in wall 78 allow passage of water while preventing the escape of fish into the mechanical filter chamber 40. The water, after flowing through slots 80 by gravity, flows through the foam block 43 and other filter material (not shown) in the filter chamber 40. Water passing through the mechanical/chemical filter is drawn into pipes 54 and 56, the water then being coupled to the air lift tubes, 64 and 66, respectively, thus completing the circulation pattern of the water within the aquarium.

The air lift technique for circulating the water provides an efficient and simplified technique for oxygenating the water as noted previously. In addition, certain organic and inorganic compounds adhere to the interface between the air bubbles and water. The tiny air bubbles accumulate as foam which is then collected and removed from the aquarium. The foam is collected by sponge foam block 43 after rising through the air lift tubes 64 and 66, and passing through space 90 above wall 92. The material 43 is rinsed periodically to remove the collected foam and other debris and then repositioned in chamber 40 for reuse.

The present invention thus provides an improved aquarium filtration system which remains relatively clean for long periods of time thus requiring less maintenance. The use of an air pump, instead of a conventional water pump, substantially reduces the cost of the filtration system and provides complete oxygenation of the water and allows the use of a protein skimmer. The reverse flow undergravel biological function is efficient and allows for a greater carrying capacity of biological life (bioload).

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A filtering aquarium comprising:
   an aquarium tank comprising two longitudinal walls, two end walls and an aquarium floor member;
   a vertical wall extending to said aquarium floor, said aquarium divided into first and second compartments, said second compartment having first and second separated portions, a slotted member at the top of said wall creating a waterfall from said first compartment into said second compartment;
   a plurality of vertically extending tubes positioned in the second portion of said second compartment;
   a first set of slotted horizontal pipes extending from said second compartment into said first compartment, said horizontal pipes disposed adjacent said aquarium floor;
   air pump means coupled to said vertically extending tubes; and
   support means positioned above said horizontally extending pipes, a layer of gravel covering said support means wherein said air pump means coupled to said vertically extending tubes forces water into said first compartment through said horizontal pipes, the water rising up through said gravel, a continuous process of filtering and aeration occurring in said first and second compartments.

2. The apparatus of claim 1 further including a second set of slotted horizontal pipes positioned in the first portion of said second compartment, one end of each of said second set of slotted horizontal pipes being coupled to one end of a corresponding vertically extending pipe.

3. The apparatus of claim 2 wherein said air pump means includes means for generating air bubbles to force water inside said vertically extending tubes upwardly, the water overflowing to the bottom of the second portion of said second compartment.

4. The apparatus of claim 3 wherein said first set of slotted horizontal pipes intakes the water overflowing to the bottom of the second portion of said second compartment.

5. The apparatus of claim 4 wherein the second set of horizontal pipes within the first portion of said second compartment intakes the water overflowing through said slotted member.

6. The apparatus of claim 1 further including a foam absorption member positioned in the first portion of said second compartment at the inflow of water into said second compartment from said slotted member.

7. The apparatus of claim 6 wherein foam produced in the second portion of said second compartment is transferred to the first portion of said second compartment through an opening in vertically extending wall separating the first and second portions of said second compartment.

8. The apparatus of claim 7 wherein foam generated by the filtering process is collected by said foam absorption member.

9. The apparatus of claim 8 wherein said foam absorption member is removable from said second compartment.

* * * * *